US011567202B2

(12) United States Patent
Holleczek et al.

(10) Patent No.: US 11,567,202 B2
(45) Date of Patent: Jan. 31, 2023

(54) SPAD-BASED LIDAR SYSTEM

(71) Applicant: Robert Bosch GmbH, Stuttgart (DE)

(72) Inventors: Annemarie Holleczek, Stuttgart (DE);
Tobias Peterseim, Boeblingen (DE)

(73) Assignee: Robert Bosch GmbH, Stuttgart (DE)

(*) Notice: Subject to any disclaimer, the term of this patent is extended or adjusted under 35 U.S.C. 154(b) by 734 days.

(21) Appl. No.: 16/494,986

(22) PCT Filed: Mar. 19, 2018

(86) PCT No.: PCT/EP2018/056843
§ 371 (c)(1),
(2) Date: Sep. 17, 2019

(87) PCT Pub. No.: WO2018/172258
PCT Pub. Date: Sep. 27, 2018

(65) Prior Publication Data
US 2020/0064479 A1 Feb. 27, 2020

(30) Foreign Application Priority Data
Mar. 20, 2017 (DE) .......................... 102017204586.8

(51) Int. Cl.
*G01S 17/42* (2006.01)
*G01S 17/18* (2020.01)
*G01S 7/499* (2006.01)

(52) U.S. Cl.
CPC .............. *G01S 17/42* (2013.01); *G01S 7/499* (2013.01); *G01S 17/18* (2020.01)

(58) Field of Classification Search
CPC .......... G01S 17/42; G01S 7/499; G01S 17/18; G01S 17/931; G01S 7/4861; G01S 7/4865; G01S 7/4876; G01S 7/493
(Continued)

(56) References Cited

U.S. PATENT DOCUMENTS 3,813,140 A 5/1974 Knockeart
4,184,767 A * 1/1980 Hughes .................. G01S 17/10
356/402
(Continued)

FOREIGN PATENT DOCUMENTS

DE 102011005746 A1 9/2012
DE 202012010014 U1 1/2014
(Continued)

OTHER PUBLICATIONS

International Search Report for PCT/EP2018/056843, dated Jun. 7, 2018.

*Primary Examiner* — Nam V Nguyen
(74) *Attorney, Agent, or Firm* — Norton Rose Fulbright US LLP; Gerard Messina

(57) ABSTRACT

A LIDAR system includes a transmitting device for light; a receiving device for light, including a first and a second photon detector; and an evaluation device that is configured for determining a time period between the emission of light with the aid of the transmitting device and the incidence at the receiving device of the light reflected on an object. The transmitting device is configured for emitting a superimposition of horizontally and vertically polarized light; the first photon detector is configured for detecting only horizontally polarized light, and the second photon detector is configured for detecting only vertically polarized light; in addition, the evaluation device is configured for determining the time period, based on light that is incident on both photon detectors within a predetermined interval.

9 Claims, 3 Drawing Sheets

(58) Field of Classification Search
USPC .............................................. 356/4.01, 141.5
See application file for complete search history.

(56) References Cited

U.S. PATENT DOCUMENTS

| | | | |
|---|---|---|---|
| 7,760,334 B1 | 7/2010 | Evans | |
| 9,116,243 B1 | 8/2015 | Brown | |
| 9,905,992 B1 * | 2/2018 | Welford | ................ H01S 3/0627 |
| 9,933,522 B2 * | 4/2018 | Zheleznyak | ............ G01S 17/86 |
| 9,971,025 B2 * | 5/2018 | Fendt | .................... G01S 7/4815 |
| 10,545,238 B1 * | 1/2020 | Rezk | ....................... G01S 17/42 |
| 2013/0300840 A1 | 11/2013 | Borowski | |
| 2015/0192676 A1 | 7/2015 | Kotelnikov et al. | |

FOREIGN PATENT DOCUMENTS

| | | |
|---|---|---|
| WO | 2005092071 A2 | 10/2015 |
| WO | 2016116756 A1 | 7/2016 |

* cited by examiner

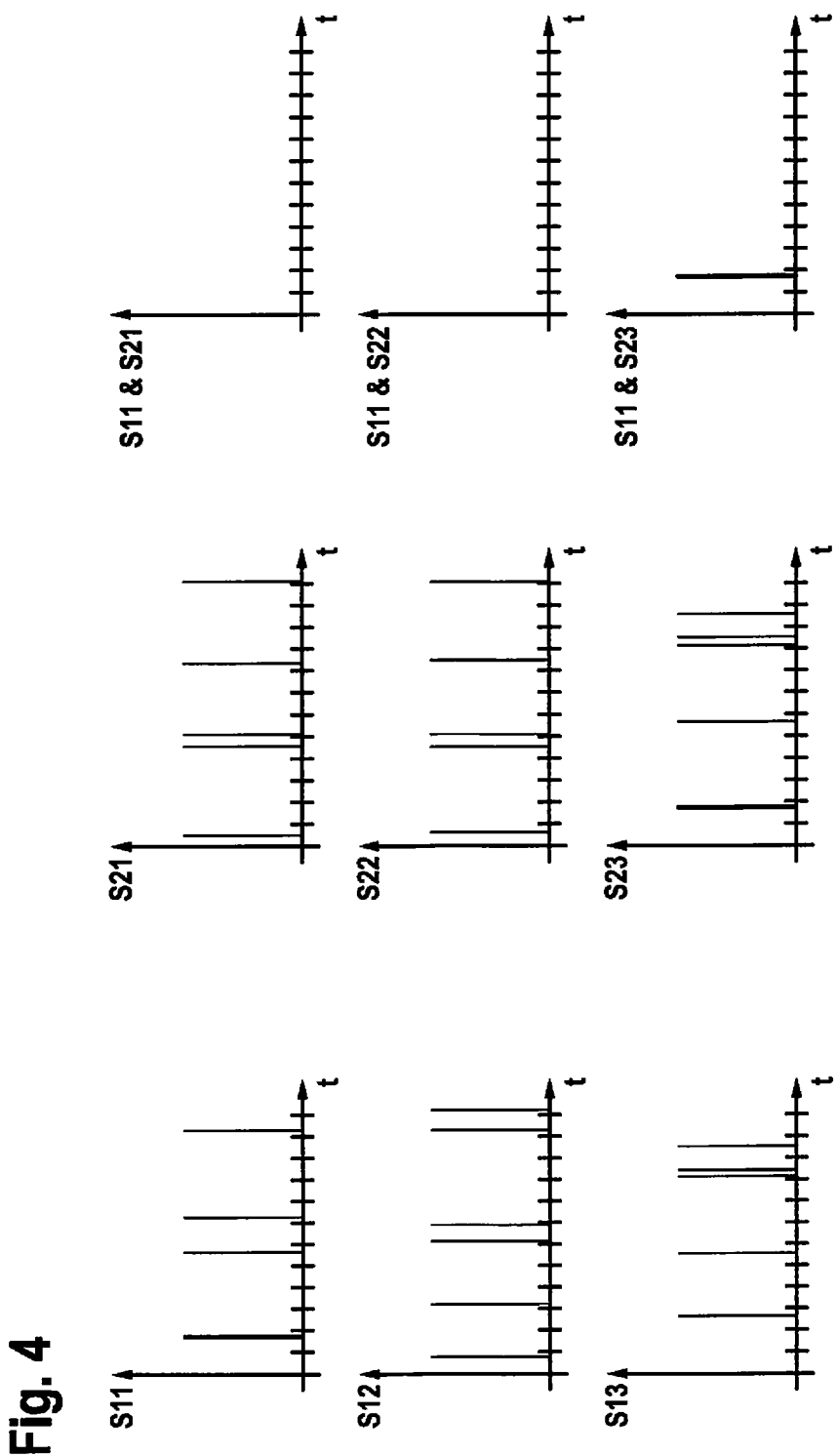

SPAD-BASED LIDAR SYSTEM

FIELD OF THE INVENTION

The present invention relates to a light detection and ranging (LIDAR) system for distance determination with the aid of optical scanning. In particular, the present invention relates to a LIDAR system that includes a single-photon avalanche detector (SPAD).

BACKGROUND INFORMATION

Present LIDAR systems are made up of a transceiver for laser light. The transmitting device transmits continuous wave (CW)-modulated or pulsed, generally infrared, laser light in the transmission direction. When this light strikes a moving or stationary object, for example a motor vehicle that is traveling or stopped, or a pedestrian, it is reflected back in the direction of the receiving unit. When the time difference between the point in time of transmission and the point in time of reception is evaluated in a detector (time of flight (TOF) method), a conclusion may be drawn concerning the distance traveled by the photons of the laser light, and thus, the distance from the object. Such a detector may be, for example, an avalanche photo diode (APD), a complementary metal oxide semiconductor (CMOS), or a SPAD.

In particular, a SPAD may be so sensitive that background light in the area of the scanned object may have an interfering effect. An extremely narrow-band optical filter is generally necessary in order to reduce the background light to an acceptable level. The LIDAR system may thus be complicated and expensive.

Patent document DE 10 2011 005 746 A1 refers to a LIDAR system in which the receiving device includes a plurality of pixels, each encompassing a SPAD, and whose signals may be dynamically grouped for the evaluation.

Patent document US 2015 0 192 676 A1 refers to a LIDAR system that includes a SPAD, in which only photons that originate from a predetermined geometric measuring field are detected.

SUMMARY OF THE INVENTION

An object of the present invention is to provide a SPAD-based LIDAR system including reduced sensitivity to background light. This object may be achieved by the present invention by the subject matter of the disclosures herein. The further descriptions herein set forth further specific embodiments.

A LIDAR system includes a transmitting device for light; a receiving device for light, including a first and a second photon detector; and an evaluation device that is configured for determining a time period between the emission of light with the aid of the transmitting device and the incidence at the receiving device of the light reflected on an object. The transmitting device is configured for emitting a superimposition of horizontally and vertically polarized light; the first photon detector is configured for detecting only horizontally polarized light, and the second photon detector is configured for detecting only vertically polarized light; in addition, the evaluation device is configured for determining the time period, based on light that is incident on both photon detectors within a predetermined interval.

The present invention is based on the knowledge that background light that originates not from the transmitting device, but, rather, from some other light source such as the sun, is polarized horizontally (H) with a much higher probability than it is polarized vertically (V). In addition, H- and V-polarized components of the background light generally do not coincide temporally. An improved distinction between background light and reflected light may be made based on this characteristic. A standard filter may be used to reduce the effect of background light. An expensive, extremely narrow-band optical filter may not be necessary. The optical signal-to-noise ratio (SNR) of the sensor may be improved, so that the LIDAR system may have an increased range. The object may be localized in an improved manner; i.e., its direction or distance may be determined with improved accuracy. The optical aperture of the LIDAR system may be reduced to a point at which only individual photons of the emitted light actually strike the photon detectors. The dimensions of the LIDAR system may thus be reduced.

Bundling of multiple closely situated photon detectors ("macropixels") may be unnecessary. Microstructuring of a semiconductor material may be improved. A smaller number of measuring operations may be necessary for scanning the object. The determination effort may likewise be reduced due to the correspondingly reduced number of measured values. In addition, the determined result may be obtained more quickly. The technical complexity of the described LIDAR system may be reasonable. Less light may be emitted, as the result of which eye safety, among other things, may be more easily ensured.

The transmitting device is configured in particular for emitting what may be equal portions of horizontal and vertically polarized light. Both components are linearly polarized, so that the transmitting device may emit polarized light in particular linearly at approximately a 45° angle. In one specific embodiment, linearly polarized light is provided that is rotated into the predetermined polarization angle with the aid of a lambda half-wave plate, for example.

It also may be provided for the transmitting device to be configured for emitting coherent light. For this purpose, the transmitting device may include in particular a laser light source. For example, a cost-effective semiconductor laser, solid-state laser, fiber laser, or a powerful tube laser may be used in various specific embodiments.

It particularly may be provided that the transmitting device is configured for emitting light whose horizontally polarized component together with the vertically polarized component forms a quantum mechanical entanglement. This may be achieved in particular in that the light that is linearly polarized at approximately a 45° angle is derived from a single coherent laser light source.

In another specific embodiment, the photon detectors each include a SPAD. In principle, the SPAD intensifies an incident photon in an avalanche-like manner in order to provide a detection signal. To prevent the SPAD itself from having to be continually re-excited, it must be subsequently damped or throttled (active or passive quenching). This operation results in a dead time in the range of generally several 10 nanoseconds until a new measurement is possible. The position of the measuring window in time may generally be controlled with the aid of a control connection (gate). In this way, the predetermined interval may be synchronized at both photon detectors. Light components that strike both photon detectors within the same time interval may thus be easily distinguished from temporally uncorrelated light.

In addition, it may be provided that the LIDAR system includes a polarizing beam splitter in order to split incident light at the receiving device into a horizontally polarized component and a vertically polarized component. This type of beam splitter may be formed from two prisms that are put together similarly to a cube. This is also referred to as a polarization cube. A polarizing beam splitter is referred to as PBS for short.

Furthermore, it may be provided that the transmitting device emits light of a predetermined band, and that the receiving device includes an optical filter for discrimination of light situated outside the band. This filter may have a configuration that is integrated with the polarizing beam splitter.

A method for determining a time period between the emission of light and the incidence of the light reflected on an object includes the steps of emitting a superimposition of horizontally and vertically polarized light; receiving a horizontally polarized component of the reflected light and a vertically polarized component of the reflected light within a predetermined interval; and determining the time period, based on the components of the light that are incident within the interval.

The relative simultaneity of the different incident components of the light may be controlled by the length of the interval. The extent of reduction of the sensitivity of the method to background light may be influenced in this way.

A computer program product includes program code for carrying out the above-described method when the computer program product runs on a processing device or is stored on a computer-readable data medium.

The method may run in particular completely or partially on the evaluation device of the LIDAR system described above. For this purpose, the evaluation device may include a programmable microcomputer or microcontroller.

Due to the close relationship between the LIDAR system and the described method, features or advantages of the method generally also refer to the system, and vice versa.

The present invention is now described in greater detail with reference to the appended figures.

BRIEF DESCRIPTION OF THE DRAWINGS

FIG. 4 shows an illustration of measurements with the aid of a LIDAR system that includes multiple photon detectors.

DETAILED DESCRIPTION

Figure 1:
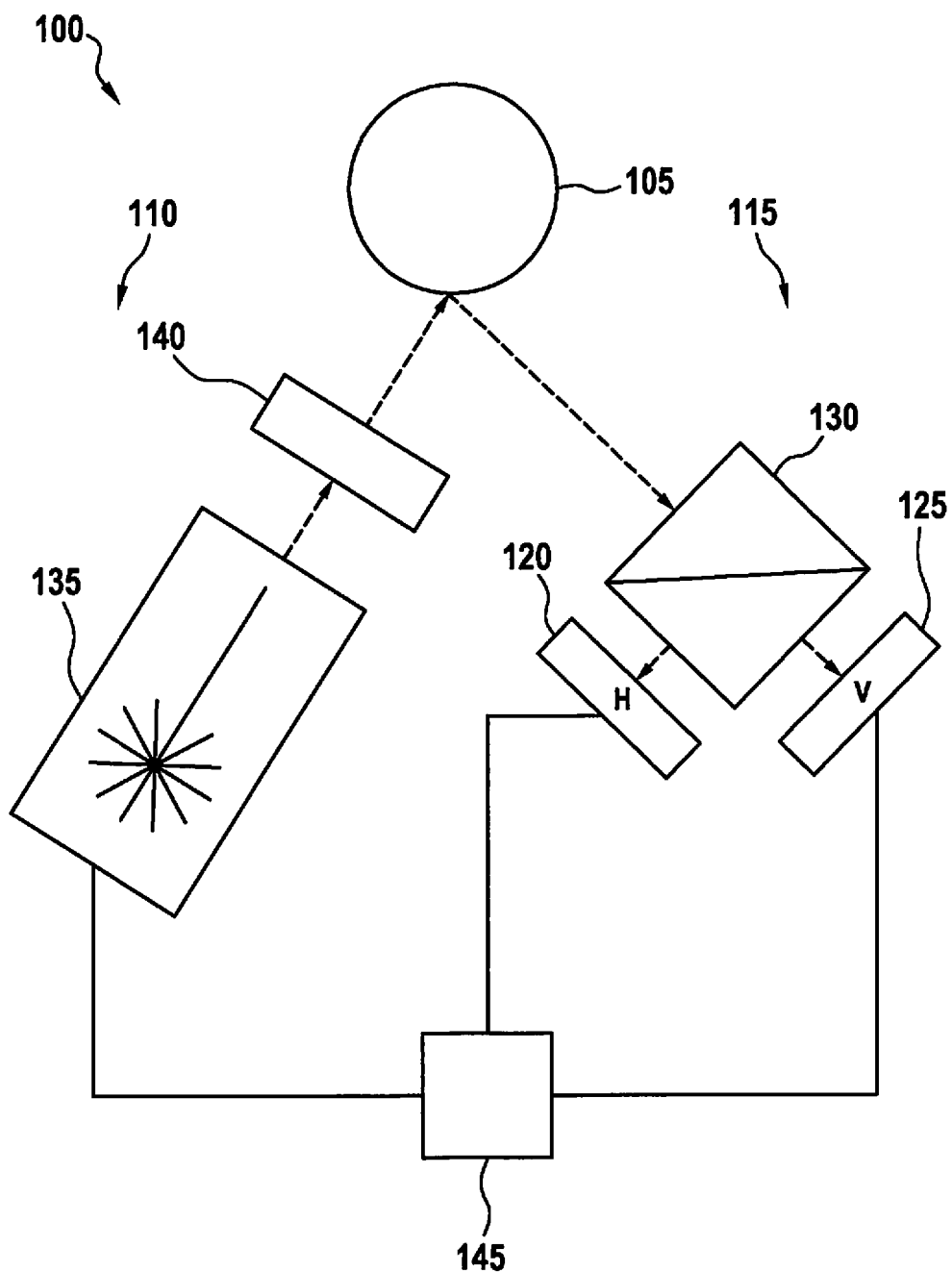
FIG. 1 shows a schematic configuration of a LIDAR system.

FIG. 1 shows a schematic configuration of a LIDAR system 100. LIDAR system 100 is configured for optically determining a direction or a distance of an object 105. LIDAR system 100 may be used in particular for scanning the surroundings of a motor vehicle. Object 105 may involve another road user or another vehicle, for example.

The scanning by a LIDAR system generally takes place with the aid of a light beam that is swiveled and/or rotated as a function of time. Alternatively, a so-called solid-state system or a flash LIDAR system may also be used. In both systems no moving parts are used, and the field of view (FOV) as a whole is illuminated. In the schematic illustration in FIG. 1, a fixed measuring range is assumed for the sake of simplicity.

LIDAR system 100 includes a transmitting device 110 for emitting light and a receiving device 115 for receiving light, which in particular has previously been emitted by transmitting device 110 and reflected on object 105. For this purpose, receiving device 115 may include a first photodetector 120 and a second photodetector 125. First photodetector 120 is configured for detecting only horizontally polarized light, while second photodetector 125 is configured for detecting only vertically polarized light. It particularly may be provided that incident light at receiving device 115 is split into its horizontal and vertical components with the aid of a polarizing beam splitter 130 and conducted to particular photodetector 120, 125. Beam splitter 130 may in particular include a so-called polarization cube.

Transmitting device 110 may in particular include a laser light source 135 that is configured for emitting coherent light of a predetermined wavelength band. The light provided by transmitting device 110 may be linearly polarized, with components of the light that are horizontally polarized and those that are vertically polarized being equal. A polarization angle of the light that is emitted by transmitting device 110 in the direction of object 105 of approximately 45° may thus result. In the illustrated specific embodiment, such linearly polarized light is provided by rotating the coherent light, provided by light source 135, into the desired polarization plane with the aid of a polarizer 140.

An evaluation device 145 is configured for controlling transmitting device 110 and receiving device 115 in order to control the optical scanning operation. Controlling the provision of the light with the aid of transmitting device 110, for example by switching it on and off or its modulation, is optional. Evaluation device 145 is configured in particular for controlling photon detectors 120, 125 to detect incident photons (components of the light that is incident in receiving device 115) within a time window that is synchronous for both photon detectors 120, 125. This time window is generally several nanoseconds to several tens of nanoseconds, but may also be longer, for example in the range of 100 nanoseconds or greater.

Figure 2:
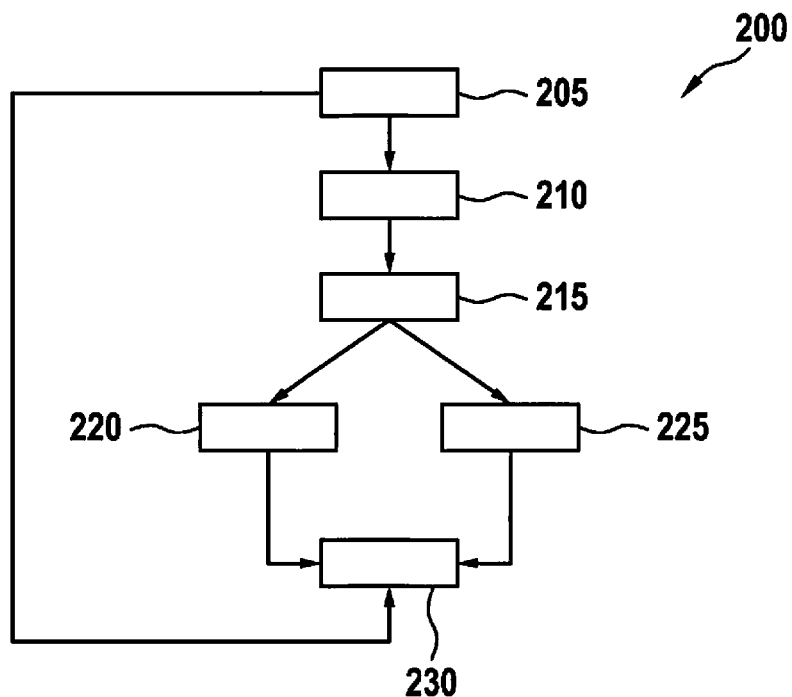
FIG. 2 shows a flow chart of a method.

FIG. 2 shows a flow chart of a method 200 for optical scanning of object 105. Method 200 may be carried out in particular within the meaning of LIDAR system 100 from FIG. 1. For this purpose, method 200 may be completely or partially present in the form of a computer program product that may run in particular on a processing device of evaluation device 145.

Horizontal and vertically polarized light is emitted, for example with the aid of transmitting device 110, in the above-described manner in a step 205. The emitted light may be linearly polarized, and includes a horizontally polarized component and a vertically polarized component that are mutually entangled, and that may be situated within a predetermined wavelength band. The previously emitted light is optionally scattered on object 105 in a step 210, so that the light is incident in the direction of receiving device 115.

The light that is incident on receiving device 115 may be split into a horizontally polarized component and a vertically polarized component in a step 215. Subsequently, detection of the horizontally polarized component and of a vertically polarized component of the light that is incident in receiving device 115 within a shared time window or time interval takes place in a step 220 and in a step 225, respectively. Only when horizontally polarized as well as vertically polarized light are detected within the same interval can a conclusion be drawn that the incident light was originally emitted in step 205 and is not background light.

A determination of a property of object 105 may be carried out in a step 230, based on the incident light. In particular, the travel time (time of flight (TOF)) of the light between the emission by transmitting device 110 and the reception with the aid of receiving device 115 may be determined, and on this basis the distance of object 105 from LIDAR system 100 may be derived.

Additionally or alternatively, a direction of object 105 may be determined in a conventional LIDAR system 100 whose scanning range is mechanically or optically adjusted (generally cyclically).

Figure 3:
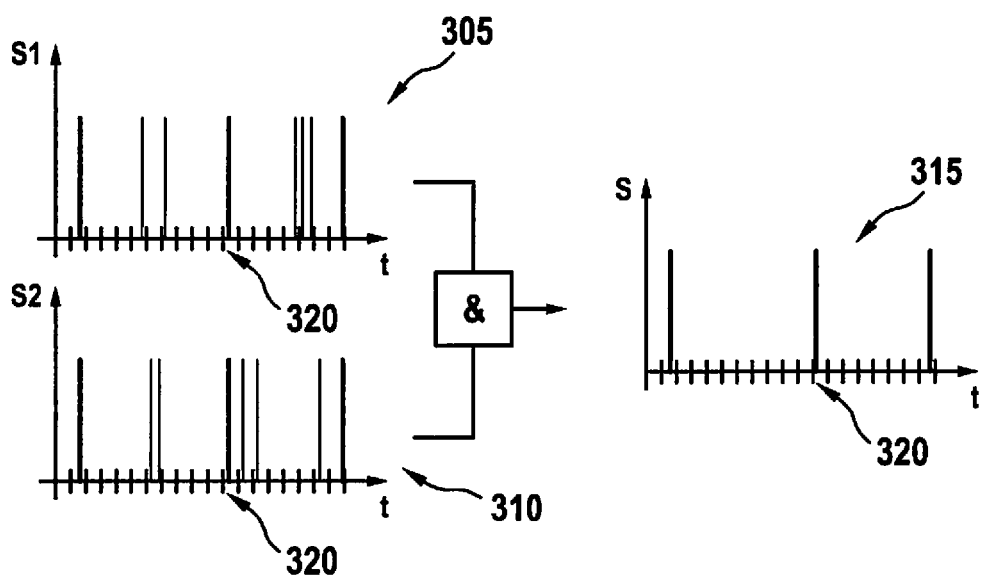
FIG. 3 shows an illustration of measurements with the aid of the LIDAR system from FIG. 1.

FIG. 3 shows an illustration of measurements with the aid of LIDAR system 100 from FIG. 1. A first diagram 305, a second diagram 310, and a third diagram 315 each include a horizontal time axis for the same time range, and a vertical signal axis. First diagram 305 depicts signals of incident light of first photodetector 120, and second diagram 310 depicts signals of incident light of second photodetector 125. The time axis is divided into successive intervals 320 of equal size, each interval 320 corresponding to a separate temporal measuring window of the two photon detectors 120, 125. For better ease of recognition, signals of the two photon detectors 120, 125 that fall in equal intervals 320 are illustrated with thicker lines than signals of temporally uncorrelated light.

In the specific embodiment illustrated, the signals of photon detectors 120, 125 in each interval 320 are linked with the aid of a logical AND condition. Therefore, in third diagram 315 a signal S results only in those intervals 320 in which a signal Si of first photodetector 120 as well as a signal of second photodetector 125 are present. Background light that has not been emitted by transmitting device 110, and therefore is not coherent, not polarized in the provided manner, or not superimposed, may thus ideally be completely discriminated. The optical scanning of object 105 may thus be carried out with improved precision.

Receiving device 115 illustrated in FIG. 1 may be limited to a single (preset) scanning area. This is also referred to as a zero-dimensional measurement. However, the described technique may also be used for a one- or two-dimensional arrangement of photon detectors 120, 125.

FIG. 4 shows an illustration of measurements of a LIDAR system 100 with a geometric arrangement of multiple photon detectors 120, 125. First photon detectors 120 and second photon detectors 125 are generally associated with one another in pairs, and the pairs of photon detectors 120, 125 may be situated (linearly) offset in a row. In the illustration in FIG. 1, photon detectors 120, 125 may be stacked, for example, in the vertical direction relative to the plane of the drawing.

The illustration in FIG. 4 follows the principle of that in FIG. 3. Signals S11, S12, and S13 refer to (vertically) offset first photon detectors 120, and signals S21, S22, and S23 refer to correspondingly (vertically) offset second photon detectors 125. The individual signals may be combined with one another in pairs, it being possible to form m×n different combinations. In the illustration in FIG. 4, signal S11 is linked to signals S21, S22, and S23 with the aid of a logical AND operation. The result of the linkage is illustrated in the right area of FIG. 4. In this way, the above-described principle may be employed for use with the aid of a one-dimensional arrangement of photon detectors 120, 125, and in a corresponding refinement, also a multidimensional arrangement of photon detectors 120, 125.

What is claimed is:

1. A light detection and ranging (LIDAR) system, comprising:
a transmitting device;
a receiving device including a first photon detector and a second photon detector; and
an evaluation device;

wherein:
the transmitting device is configured for emitting a superimposition of horizontally and vertically polarized light;
the first photon detector is configured for detecting only horizontally polarized light;
the second photon detector is configured for detecting only vertically polarized light; and
the evaluation device is configured to:
identify a subset of a plurality of predefined time intervals in which both a portion of the horizontally polarized light is detected by the first photon detector and a portion of the vertically polarized light is detected by the second photon detector; and
based on the identification, perform a time period determination selectively based on the detections made by the first and second photon detectors within the identified subset of time intervals, detections by either of the first and second photon detectors made in other ones of the time intervals in which detections by only one of the first and second photon detectors occurs being ignored for the time period determination, the time period determination being a determination of a time period between the emission of the emitted light by the transmitting device and an incidence at the receiving device of light reflected on an object.

2. The LIDAR system of claim 1, wherein the transmitting device is configured for emitting equal portions of horizontally and vertically polarized light.

3. The LIDAR system of claim 1, wherein the transmitting device is configured for emitting coherent light.

4. The LIDAR system of claim 1, wherein the transmitting device is configured for emitting light whose horizontally polarized component together with the vertically polarized component forms a quantum mechanical entanglement.

5. The LIDAR system of claim 1, wherein the photon detectors each include a single-photon avalanche detector (SPAD).

6. The LIDAR system of claim 1, further comprising:
a polarizing beam splitter to split incident light at the receiving device into a horizontally polarized component and a vertically polarized component.

7. The LIDAR system of claim 1, wherein the transmitting device emits light of a predetermined band, and the receiving device includes an optical filter for discrimination of light situated outside the band.

8. A method comprising:
emitting a superimposition of horizontally and vertically polarized light;
receiving horizontally polarized components of reflected light;
receiving vertically polarized components of the reflected light;
identifying a subset of a plurality of predefined time intervals in which both at least one of the horizontally polarized components is detected and at least one of the vertically polarized components is detected; and
based on the identification, performing a time period determination selectively based on the those of the horizontally polarized and vertically polarized components that have been detected within the identified subset of time intervals, those of the horizontally polarized and vertically polarized components that have been detected in other ones of the time intervals in which detections of only horizontally polarized components occur or only vertically polarized components occur being ignored for the time period determination, wherein the time period determination is a determination of a time period between the emission of the emitted light and an incidence of light reflected on an object.

9. A non-transitory computer readable medium having a computer program that is executable by a processor and that, when executed by the processor, causes the processor to perform a method, the method comprising:
   emitting a superimposition of horizontally and vertically polarized light using a system that is configured for receiving horizontally polarized components of reflected light and receiving vertically polarized components of the reflected light;
   identifying a subset of a plurality of predefined time intervals in which both at least one of the horizontally polarized components is detected and at least one of the vertically polarized components is detected; and
   based on the identification, performing a time period determination selectively based on the those of the horizontally polarized and vertically polarized components that have been detected within the identified subset of time intervals, those of the horizontally polarized and vertically polarized components that have been detected in other ones of the time intervals in which detections of only horizontally polarized components occur or only vertically polarized components occur being ignored for the time period determination, wherein the time period determination is a determination of a time period between the emission of the emitted light and an incidence of light reflected on an object.

* * * * *